United States Patent
Yasuda et al.

(10) Patent No.: US 8,030,428 B2
(45) Date of Patent: Oct. 4, 2011

(54) CURABLE COMPOSITION

(75) Inventors: Teruhiko Yasuda, Kamisu (JP); Yoshitaka Sunayama, Kamisu (JP); Genichirou Enna, Kamisu (JP)

(73) Assignee: Asahi Glass Company, Limited, Tokyo (JP)

( * ) Notice: Subject to any disclaimer, the term of this patent is extended or adjusted under 35 U.S.C. 154(b) by 254 days.

(21) Appl. No.: 12/388,597

(22) Filed: Feb. 19, 2009

(65) Prior Publication Data

US 2009/0163662 A1 Jun. 25, 2009

Related U.S. Application Data

(63) Continuation of application No. PCT/JP2007/066214, filed on Aug. 21, 2007.

(30) Foreign Application Priority Data

Aug. 22, 2006 (JP) ................................ 2006-225201

(51) Int. Cl.
*C08L 71/02* (2006.01)

(52) U.S. Cl. .............................. 528/21; 525/187; 528/35

(58) Field of Classification Search .................. None
See application file for complete search history.

(56) References Cited

U.S. PATENT DOCUMENTS

| | | | |
|---|---|---|---|
| 4,323,488 A * | 4/1982 | Takago et al. | 528/32 |
| 5,223,583 A | 6/1993 | Higuchi et al. | |
| 6,207,766 B1 | 3/2001 | Doi et al. | |
| 6,780,934 B2 | 8/2004 | Doi et al. | |
| 2002/0198352 A1 | 12/2002 | Tanaka et al. | |
| 2005/0004327 A1 * | 1/2005 | Ueda et al. | 525/477 |
| 2007/0173557 A1 * | 7/2007 | Bublewitz et al. | 523/109 |

FOREIGN PATENT DOCUMENTS

| | | |
|---|---|---|
| EP | 0 982 355 A1 | 3/2000 |
| JP | 63-112642 | 5/1988 |
| JP | 5117520 | 5/1993 |
| JP | 7238143 | 9/1995 |
| JP | 3122775 | 10/2000 |
| JP | 2004292623 | 10/2004 |
| WO | WO 2005/077321 * | 8/2005 |

OTHER PUBLICATIONS

U.S. Appl. No. 09/694,501, filed Oct. 24, 2000, Doi, et al.
U.S. Appl. No. 12/841,201, filed Jul. 22, 2010, Sunayama, et al.

* cited by examiner

*Primary Examiner* — Marc Zimmer
(74) *Attorney, Agent, or Firm* — Oblon, Spivak, McClelland, Maier & Neustadt, L.L.P.

(57) ABSTRACT

To provide a curable composition which has a high curing rate and can provide a cured product having good durability.
A curable composition comprising an oxyalkylene polymer (A) having a reactive silicon group represented by the following formula (1), and a quaternary ammonium salt (B):

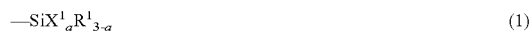

wherein $R^1$ is a $C_{1-20}$ monovalent organic group which may have a substituent, $X^1$ is a hydroxyl group or a hydrolyzable group, and a is an integer of from 1 to 3; provided that when plural $R^1$s are present, they may be the same or different from one another, and when plural $X^1$s are present, they may be the same or different from one another.

10 Claims, No Drawings

1

CURABLE COMPOSITION

TECHNICAL FIELD

The present invention relates to a curable composition.

BACKGROUND ART

Heretofore, a polymer has been known which has at least one silicon atom-containing group containing a silicon atom having a hydroxyl group or a hydrolyzable group bonded thereto, and which is crosslinkable by forming a siloxane bond.

As a curing catalyst to cure such a polymer, various ones are known, and for examples, Patent Document 1 describes use of an organic metal compound such as dibutyltin dilaurate, tin octylate or lead octylate.

Further, Patent Document 2 describes use of a carboxylic acid and an amine or an amine derivative in combination.
Patent Document 1: JP-A-63-112642
Patent Document 2: Japanese Patent No. 3,122,775

DISCLOSURE OF THE INVENTION

Problems to be Solved by the Invention

Nonetheless, there are problems that an organic metal compound containing tin or lead is expensive, and that a cured product obtained by using an organic tin compound as a curing catalyst, is likely to undergo surface-swelling when a cycle of humidifying and heating is repeated, and thus is poor in durability.

On the other hand, when a carboxylic acid and an amine or an amine derivative are used instead of the metal compound, there is a problem such that the curing rate of a polymer is low.

The present invention has been made under the above circumstances, and it has an object to provide a curable composition which has a high curing rate and provides a cured product having good durability.

Means to Solve the Problems

In order to solve the above problems, the curable composition of the present invention comprises an oxyalkylene polymer (A) having a reactive silicon group represented by the following formula (1), and a quaternary ammonium salt (B):

   (1)

wherein $R^1$ is a $C_{1-20}$ monovalent organic group which may have a substituent, $X^1$ is a hydroxyl group or a hydrolyzable group, and a is an integer of from 1 to 3; provided that when plural $R^1$s are present, they may be the same or different from one another, and when plural $X^1$s are present, they may be the same or different from one another.

The quaternary ammonium salt (B) is preferably a compound represented by the following formula (2):

   (2)

wherein each of $R^2$ to $R^5$ is independently a $C_{1-25}$ linear or branched saturated or unsaturated hydrocarbon group, and $X^2$ is an organic acid ion, an inorganic acid ion or a hydroxyl group.

In the formula (2), at least 1 and at most 3 groups among $R^2$ to $R^5$ are preferably $C_{6-25}$ linear or branched saturated or unsaturated hydrocarbon groups, and at least 1 group of the rest of groups is preferably a $C_{1-5}$ linear or branched saturated hydrocarbon group.

The quaternary ammonium salt (B) is preferably contained in an amount of from 0.1 to 10 parts by mass per 100 parts by mass of the oxyalkylene polymer (A).

The oxyalkylene polymer (A) is preferably a polymer obtained by a urethanization reaction of a polymer (pP) having a polyoxyalkylene chain and hydroxyl groups, with an isocyanate compound (U) having a group represented by the following formula (3) and isocyanate groups, and the ratio of the total number of isocyanate groups in the isocyanate compound (U) to the total number of hydroxyl groups in the polymer (pP) (a molar ratio of isocyanate groups/hydroxyl groups), in the urethanization reaction is preferably from 0.80 to 1.10:

   (3)

wherein $R^1$ is a $C_{1-20}$ monovalent organic group which may have a substituent, $X^1$ is a hydroxyl group or a hydrolyzable group, and a is an integer of from 1 to 3; provided that when plural $R^1$s are present, they may be the same or different from one another, and when plural $X^1$s are present, they may be the same or different from one another.

An acrylic polymer (C) having a reactive silicon group represented by the following formula (4) and an is alkyl ester (meth)acrylate monomer unit, is preferably further contained:

   (4)

wherein $R^{41}$ is a $C_{1-20}$ monovalent organic group which may have a substituent, $X^{41}$ is a hydroxyl group or a hydrolyzable group, and b is an integer of from 1 to 3; provided that when plural $R^{41}$s are present, they may be the same or different from one another, and when plural $X^{41}$s are present, they may be the same or different from one another.

Effect of the Invention

According to the present invention, it is possible to obtain a curable composition which has a high curing rate and provides a cured product having good durability. Here, "durability" in the present invention means a nature whereby surface-swelling can be prevented when the cured product is subjected to a cycle of humidification and heating repeatedly.

BEST MODE FOR CARRYING OUT THE INVENTION

Oxyalkylene Polymer (A)

The oxyalkylene polymer (A) (hereinafter sometimes referred to as a component (A)) to be used in the present invention is a polymer having a polyoxyalkylene chain. Specific examples of the polyoxyalkylene chain may, preferably, be a polyoxyethylene chain, a polyoxypropylene chain, a polyoxybutylene chain, a polyoxyhexylene chain, a polyoxytetramethylene chain and "a molecular chain made of a copolymerized product of at least two cyclic ethers." The main chain of the oxyalkylene polymer (A) may be a molecular chain made of one of them or may be a molecular chain made of a combination of a plurality of them. Particularly, the oxyalkylene polymer (A) is preferably one having only a polyoxypropylene chain substantially as its main chain.

The oxyalkylene polymer (A) has a reactive silicon group represented by the following formula (1) as a substituent in its side chain or at its terminal. The reactive silicon group is more preferably contained as a substituent at the terminal. The reactive silicon group may be bonded directly to the polyoxyalkylene chain or may be bonded via another organic group. In the formula (1), "a" is an integer of from 1 to 3.

$$—SiX^1_a R^1_{3-a} \quad (1)$$

In the formula (1), $R^1$ is a $C_{1-20}$ monovalent organic group which may have a substituent. $R^1$ is preferably an alkyl group having at most 8 carbon atoms, more preferably a methyl group. When plural $R^1$s are present in the same molecule, such plural $R^1$s may be the same or different from one another.

In the formula (1), $X^1$ is a hydroxyl group or a hydrolyzable group. Here, a hydrolyzable group means a substituent which is directly bonded to a silicon atom and is capable of forming a siloxane bond by a hydrolysis reaction and/or a condensation reaction. The hydrolyzable group may, for example, be a halogen atom, an alkoxy group, an acyloxy group or an alkenyloxy group. When the hydrolyzable group has carbon atoms, the number of carbon atoms is preferably at most 6, more preferably at most 4. $X^1$ is particularly preferably an alkoxy group having at most 4 carbon atoms or an alkenyloxy group having at most 4 carbon atoms. More specifically, $X^1$ is particularly preferably a methoxy group or an ethoxy group. When plural $X^1$s are present in the same molecule, such plural $X^1$s may be the same or different from one another.

The reactive silicon group represented by the formula (1) is preferably bonded to the polyoxyalkylene chain via a divalent organic group. In such a case, the oxyalkylene polymer (A) becomes one having a group represented by the following formula (5):

$$—R^0—SiX^1_a R^1_{3-a} \quad (5)$$

In the formula (5), $R^1$, $X^1$ and a, including their preferred modes, have the same meanings as in the formula (1). Here, $R^0$ is a divalent organic group. $R^0$ is preferably a $C_{1-10}$ alkylene group which may have an ether bond, a urethane bond, an ester bond or a carbonate bond.

As the oxyalkylene polymer (A), it is possible to use one having a reactive silicon group represented by the formula (1), wherein 1, 2 or 3 X's are bonded to a silicon atom.

When at least 2 $X^1$s are bonded to a silicon atom, such $X^1$s may be the same or different from one another. Further, when the oxyalkylene polymer (A) has plural reactive silicon groups of the formula (1), they all may be the same, or at least 2 different types of groups may be contained.

The oxyalkylene polymer (A) preferably has from 1 to 8, more preferably from 1.1 to 5, most preferably from 1.1 to 3, reactive silicon groups represented by the formula (1) per molecule of the polymer. When the number of the reactive silicon groups is at most 8, the elongation of a cured body obtained by curing the curable composition becomes suitable. Further, when the oxyalkylene polymer (A) has at least one reactive silicon group, it is possible to obtain a curable composition having sufficient hardness and curability.

The oxyalkylene polymer (A) can be produced, for example, by introducing reactive silicon groups to a polyoxyalkylene chain-containing polymer (P) having a polyoxyalkylene chain as its main chain and having hydroxyl groups, unsaturated groups or the like as functional groups for introducing the reactive silicon groups.

In the polyoxyalkylene chain-containing polymer (P), the number of functional groups for introducing the reactive silicon groups is preferably from 1 to 8, more preferably from 1.1 to 5, most preferably from 1.1 to 3 groups, per molecule of the polymer (P). When the number of the reactive silicon groups is at most 8, the elongation of a cured body obtained by curing the curable composition becomes suitable. Further, when the oxyalkylene polymer (A) has at least one reactive silicon group, it is possible to obtain a curable composition having sufficient hardness and curability.

Among such polyoxyalkylene chain-containing polymers (P), a polyoxyalkylene chain-containing polymer (pP) having hydroxyl groups can be obtained, for example, by ring-opening polymerization of a cyclic ether compound in the presence of a catalyst and an initiator. In such a case, as the initiator, it is possible to use e.g. a hydroxy compound having at least one hydroxyl group. The cyclic ether compound may, preferably, be ethylene oxide, propylene oxide, butylene oxide, hexylene oxide or tetrahydrofuran. The catalyst may, for example, be an alkali metal catalyst such as a potassium compound or a cesium compound, a double metal cyanide complex catalyst, a metal porphyrin catalyst or a catalyst of a P=N bond-containing compound type such as a phosphazene compound.

The double metal cyanide complex is preferably a complex having zinc hexacyanocobaltate as the main component, and especially, an ether and/or alcohol complex is preferred. In such a case, the ether is preferably ethylene glycol dimethyl ether (glyme), diethylene glycol dimethyl ether (diglyme) or the like, particularly preferably glyme from the viewpoint of handling of the complex during production. The alcohol is preferably t-butanol.

The polyoxyalkylene chain-containing polymer (pP) having hydroxyl groups preferably has a relatively high molecular weight. Specifically, the number average molecular weight (Mn) per hydroxyl group of the polyoxyalkylene chain-containing polymer (pP) is preferably from 1,000 to 20,000, particularly preferably 3,000 to 15,000.

By using the polyoxyalkylene chain-containing polymer (P) as a raw material, a method for introducing the reactive silicon groups represented by the above formula (1) thereto may, preferably, be the following methods (a), (b), (c) and (d).

"The polyoxyalkylene chain-containing polymer (pP) having hydroxyl groups" to be used in the following methods is particularly preferably a polyoxypropylene polyol having from 2 to 6 hydroxyl groups. Further, among such polyoxypropylene polyols, polyoxypropylene diol or polyoxypropylene triol is preferred.

(a): A method of reacting a silane compound represented by the following formula (6) with a polyoxyalkylene chain-containing polymer having unsaturated groups:

$$HSiX^1_a R^1_{3-a} \quad (6)$$

In the formula (6), $R^1$, $X^1$ and a, including their preferred modes, have the same meanings as in the formula (1).

The polyoxyalkylene chain-containing polymer having unsaturated groups can be obtained, for example, by a method of reacting a compound having functional groups and unsaturated groups, reactive with hydroxyl groups, with the polyoxyalkylene chain-containing polymer (pP) having hydroxyl groups. In such a case, the unsaturated groups are bonded to the polyoxyalkylene chain via an ether bond, an ester bond, a urethane bond or a carbonate bond. Otherwise, it is also possible to obtain a polyoxyalkylene chain-containing polymer having unsaturated groups in its side chain during the polymerization of an alkylene oxide, by copolymerizing an unsaturated group-containing epoxy compound such as allylglycidyl ether therewith.

Further, as the polyoxyalkylene chain-containing polymer having unsaturated groups, it is also possible to suitably use a polyoxyalkylene having unsaturated groups such as allyl terminal polyoxypropylene monool.

The reaction of the polyoxyalkylene chain-containing polymer having unsaturated groups with a hydrosilyl compound is preferably carried out in the presence of a catalyst such as a platinum catalyst, a rhodium catalyst, a cobalt catalyst, a palladium catalyst or a nickel catalyst. Among them, a platinum catalyst such as chloroplatinic acid, platinum metal, platinum chloride or a platinum olefin complex is preferred. Further, the reaction is preferably carried out at a temperature of from 30 to 150° C., more preferably from 60 to 120° C., and the reaction time is preferably a few hours.

(b): A method of carrying out a urethanization reaction of an isocyanate compound (U) having a group represented by the following formula (3) and isocyanate groups with the polyoxyalkylene chain-containing polymer (pP) having hydroxyl groups:

$$-SiX^1_a R^1_{3-a} \quad (3)$$

In the formula, $R^1$ is a $C_{1-20}$ monovalent organic group which may have a substituent, $X^1$ is a hydroxyl group or a hydrolyzable group, and a is an integer of from 1 to 3; provided that when plural $R^1$s are present, they may be the same or different from one another, and when plural $X^1$s are present, they may be the same or different from one another.

The isocyanate compound (U) is preferably a compound represented by the following formula (3-1):

$$OCN-R^6-SiX^1_a R^1_{3-a} \quad (3-1)$$

In the formulae (3) and (3-1), $R^1$, $X^1$ and a, including their preferred molds, have the same meanings as in the formula (1). Further, $R^6$ is a divalent $C_{1-17}$ hydrocarbon group. The isocyanate compound represented by the formula (3-1) may, for example, be methyl trimethoxysilane 1-isocyanate, methyl triethoxysilane 1-isocyanate, methyl methyl dimethoxysilane 1-isocyanate, propyl trimethoxysilane 3-isocyanate or propyl triethoxysilane 3-isocyanate.

During the urethanization reaction of the polyoxyalkylene chain-containing polymer (pP) having hydroxyl groups with the above isocyanate compound (U), a known urethane-forming catalyst may be used. Further, the reaction is preferably carried out at a temperature of from 20 to 200° C., more preferably from 50 to 150° C., and the reaction time is preferably a few hours.

Such a method has a small number of production steps, whereby the production time can be significantly shortened, no impurities are formed during the production, and no complicated operation such as purification is required.

With respect to the urethanization reaction of the polymer (pP) with the isocyanate compound (U), the reaction is preferably carried out so that the ratio of the total number of isocyanate groups (NCO) in the isocyanate compound (U) to the total number of hydroxyl groups (OH) in the polymer (pP: as a raw material (i.e. isocyanate groups/hydroxyl groups) would be NCO/OH=0.80 to 1.10 by molar ratio. The NCO/OH (molar ratio) is more preferably from 0.85 to 1.00.

When the NCO/OH ratio is at least the lower limit of the above range, the storage stability becomes good. Therefore, when the NCO/OH ratio is less than the above range, it is preferred to let the isocyanate silane compound (U) or a monoisocyanate compound be additionally reacted to consume excess OH groups. When the NCO/OH ratio is at most the upper limit of the above range, it is considered that a side reactions (an allophanate-forming reaction, an isocyanurate-forming reaction, etc.) in the urethanization reaction are suppressed, and the curable composition hardly becomes thickened.

(c): A method of reacting a silicon compound represented by the following formula (7) with a polyoxyalkylene chain-containing polymer having isocyanate groups, which is obtained by reacting a polyisocyanate compound such as tolylene diisocyanate, with the polyoxyalkylene chain-containing polymer (pP) having hydroxyl groups:

$$W-R^7-SiX^1_a R^1_{3-a} \quad (7)$$

In the formula (7), $R^1$, $X^1$ and a, including their preferred modes, have the same meanings as in the formula (1). Further, $R^7$ is a divalent $C_{1-17}$ hydrocarbon group, and W is a substituent having active hydrogen. Specific examples of W may, preferably, be a hydroxyl group, a carboxy group, a mercapto group and a primary or secondary amino group. In such a method, by a reaction of the substituent having active hydrogen with the isocyanate group, the reactive silicon group is introduced.

(d): A method of reacting the polyoxyalkylene chain-containing polymer having unsaturated groups with a mercapto compound represented by the following formula (8):

$$HS-R^8-SiX^1_a R^1_{3-a} \quad (8)$$

In the formula (8), $R^1$, $X^1$ and a, including their preferred modes, have the same meanings as in the formula (1). $R^8$ is a divalent $C_{1-17}$ hydrocarbon group. The mercapto compound represented by the formula (8) may, for example, be 3-mercaptopropyl trimethoxysilane or 3-mercaptopropyl triethoxysilane.

As the polyoxyalkylene chain-containing polymer having unsaturated groups, it is possible to use the same one as in the above method (a).

The reaction between the polyoxyalkylene chain-containing polymer having unsaturated groups with the above mercapto compound may be suitably carried out in the presence of a polymerization initiator such as a radical-generating agent. Or, instead of using the polymerization initiator, radiation or heat may be used to let the reaction proceed. The polymerization initiator may, for example, be a peroxide type, azo type or redox type polymerization initiator and a metal compound catalyst. Specific examples of the polymerization initiator may, preferably, be 2,2'-azobisisobutyronitrile, 2,2'-azobis-2-methylbutyronitrile, benzoyl peroxide, t-alkylperoxyester, acetyl peroxide and diisopropyl peroxycarbonate. Further, the reaction is preferably carried out at a temperature of from 20 to 200° C., more preferably from 50 to 150° C., and the reaction time is preferably from a few hours to several tens hours.

The number average molecular weight (Mn) per terminal of the oxyalkylene polymer (A) in the present invention is preferably from 1,000 to 20,000, particularly preferably from 3,000 to 15,000, from the viewpoint that the rupture stress and rupture elongation of a cured product can be made higher. Here, in the present invention, "the number average molecular weight" means a number average molecular weight (Mn) as calculated as a standard polystyrene measured by gel permeation chromatography (GPC) by using tetrahydrofuran as a mobile phase, and "the weight average molecular weight" means a weight average molecular weight (Mw) when the same GPC measurement as above is carried out. Further, "the molecular weight distribution" represents the weight average molecular weight (Mw)/the number average molecular weight (Mn). Furthermore, Mn of the oxyalkylene polymer (A) means Mn before curing. When Mn per terminal of the oxyalkylene polymer (A) is at most 20,000, the extrusion property becomes good, and for example, when the curable composition is used as a sealant or an elastic adhesive, the workability becomes good. On the other hand, when Mn per terminal of the oxyalkylene polymer (A) is at least 3,000, the curability of the composition becomes good.

Further, as a method to control characteristics of the curable composition, there is also a method of adjusting Mw/Mn (molecular weight distribution) of the oxyalkylene polymer (A). Mw/Mn of the oxyalkylene polymer (A) can be adjusted by adjusting the type and amount of the polymerization catalyst to be used to obtain the polyoxyalkylene chain-containing polymer (P) as the raw material, or by optimizing polymerization conditions of the cyclic ether. Further, it can be adjusted by using at least two types of oxyalkylene polymers (A) as mixed.

When the strength of a cured product of the curable composition is important, Mw/Mn of the oxyalkylene polymer (A) is preferably small. As a result, even though the elastic modulus of the cured product is about the same level, the rupture elongation becomes greater, and the strength of the curable product becomes higher. Especially, the oxyalkylene polymer has Mw/Mn of preferably less than 1.6. In a comparison between the oxyalkylene polymers (A) having the same Mn, one having Mw/Mn of less than 1.6 has a less content of a polymer component having a small molecular weight, as compared with one having Mw/Mn of at least 1.6, whereby the handling efficiency of the curable composition becomes excellent since the rupture elongation and max stress of the cured product become large, and the viscosity of the polymer itself becomes low. For the same reasons, Mw/Mn is further preferably at most 1.5, more preferably at most 1.4. The oxyalkylene polymer (A) having a small Mw/Mn is preferably one obtained by a method wherein as mentioned above, by using a double metal cyanide complex as a catalyst, a polyoxyalkylene chain-containing polymer having a desired Mw/Mn is obtained in the presence of an initiator by a method of polymerizing a cyclic ether, and a terminal of the polymer is modified to introduce a reactive silicon group.

On the other hand, when it is important to obtain a curable composition having good workability by reducing a slump property of the curable composition, Mw/Mn of the oxyalkylene polymer (A) is preferably at least 1.6.

The oxyalkylene polymer (A) is mixed with a component (B) and other necessary components which will be described later, when the curable composition of the present invention is prepared.

Otherwise, it is possible to use a mixture of the oxyalkylene polymer (A) and another polymer other than the polymer (A) when the curable composition of the present invention is prepared. Such another polymer is e.g. a polymer obtained by polymerizing an unsaturated group-containing monomer, and it may be an acrylic polymer (C) which will be described later. The term "the mixture of the oxyalkylene polymer (A) and another polymer" may be a polymer mixture obtained by polymerizing the unsaturated group-containing monomer in a state where the oxyalkylene polymer (A) and the unsaturated group-containing monomer are mixed. Such another polymer may be uniformly dispersed in the form of fine particles or uniformly dissolved, in the oxyalkylene polymer (A). In consideration of the viscosity and workability of the curable composition, another polymer is preferably uniformly dispersed in the form of fine particles.

Quaternary Ammonium Salt (B)

The quaternary ammonium salt (B) (hereinafter sometimes referred to as the component (B)) to be used in the present invention is a compound wherein an $NH_4^+$ ion (hydrogen atoms may be substituted) and a monovalent anion are bonded to each other to neutralize their charges, and a compound represented by the following formula (2) is preferred:

(2)

wherein each of $R^2$ to $R^5$ is independently a $C_{1-25}$ linear or branched saturated or unsaturated hydrocarbon group, and $X^2$ is an organic acid ion, an inorganic acid ion or a hydroxyl group.

The number of carbon atoms in each of $R^2$ to $R^5$ in the formula (2) is independently from 1 to 25. If the number of carbon atoms exceeds 25, the quaternary ammonium salt tends to be solid, whereby its handling becomes difficult. The number of carbon atoms in each of $R^2$ to $R^5$ is preferably at most 20. Further, $R^2$ to $R^5$ preferably comprise at least two types of groups. That is, at least one of $R^2$ to $R^5$ is preferably a group having a different number of carbon atoms from others. In the formula (2), when $R^2$ to $R^5$ are all the same, the crystallinity of the component (B) thereby obtained will be high, whereby the solubility in a resin component or a solvent will decrease, and the handling during the operation tends to be difficult.

Further, at least one of $R^2$ to $R^5$ is preferably a $C_{6-25}$ linear or branched saturated hydrocarbon group.

Consequently, with a cured product obtained by curing the curable composition, a bleeding out phenomenon where a liquid product bleeds out can well be suppressed. This is considered attributable to an improvement in the compatibility of the quaternary ammonium salt (B) and the oxyalkylene polymer (A).

In the formula (2), at least 1 and at most 3 groups of $R^2$ to $R^5$ are preferably $C_{6-25}$ linear or branched saturated or unsaturated hydrocarbon groups, and at least one of the rest of groups is preferably a $C_{1-5}$ linear or branched saturated hydrocarbon group. All of the rest of groups are further preferably $C_{1-5}$ linear or branched saturated hydrocarbon groups.

The $C_{6-25}$ linear or branched saturated or unsaturated hydrocarbon group is more preferably a $C_{6-20}$ linear or branched saturated or unsaturated hydrocarbon group. The $C_{1-5}$ linear or branched saturated hydrocarbon group is more preferably a $C_{1-4}$ linear or branched saturated hydrocarbon group.

The organic acid ion or the inorganic acid ion in the formula (2), is a monovalent group derived from an organic acid or an inorganic acid. The acid is preferably one mentioned as an acid to be used in the production method (b) which will be described later.

Among the components (B) represented by the formula (2), a quaternary ammonium salt (B-1) wherein $X^2$ is an organic acid ion or an inorganic acid ion, may be prepared by (a) a method of reacting a quaternary ammonium hydroxide with an acid, or (b) a method of reacting a tertiary amine with a carbonic acid diester to obtain a quaternary ammonium carbonate, which is then reacted with an acid by an anion exchange reaction. The production method (b) is more preferred from the viewpoint that there will be no halogen element or alkali (earth) metal which is included during the reaction step.

The carbonic acid diester to be used in the production method (b) may, for example, be dimethyl carbonate, diethyl carbonate, ethyl methyl carbonate or dipropyl carbonate, and particularly preferred is is dimethyl carbonate.

The tertiary amine to be used in the production method (b) may, for example, be trimethylamine, triethylamine, tripropylamine, tributylamine, trihexylamine, trioctylamine, dimethyl ethylamine, dimethyl ethylamine, diethyl methylamine, dimethyl propylamine, dipropyl methylamine, benzyl dimethylamine, benzyl diethylamine, benzyl dipropylamine, benzyl dibutylamine, benzyl dihexylamine, benzyl dioctylamine, benzyl didecylamine, dimethyl octylamine, dimethyl decylamine, dimethyl dodecylamine, dimethyl tetradecylamine, dimethyl hexadecylamine, dimethyl octadecylamine, dimethyl octadecenylamine, dimethyl eicocenylamine, dimethyl docoenylamine, dioctyl methylamine, didecyl methylamine, didodecyl methylamine, ditetradecyl methylamine, dihexadecyl methylamine, dioctadecyl methylamine, dioctadecenyl methylamine, dieicocenyl methylamine, didococenyl methylamine, or a tertiary amine obtained by adding ethylene oxide and/or propylene oxide independently or as a mixture to ammonia; or a mixture of two or more of them.

Among them, preferred is triethylamine, didecyl methylamine or benzyl dimethylamine.

The acid to be used in the production method (b) may, for example, be an aliphatic monocarboxylic acid (such as formic acid, acetic acid, octylic acid or 2-ethylhexanoic acid); an aliphatic polycarboxylic acid (such as oxalic acid, malonic acid, succinic acid, glutaric acid or adipic acid); an aromatic monocarboxylic acid (such as benzoic acid, toluic acid or ethylbenzoic acid); an aromatic polycarboxylic acid (such as phthalic acid, isophthalic acid, terephthalic acid, nitrophthalic acid or trimellitic acid); a phenolic compound (such as phenol or resorcine); a sulfonic acid compound (such as alkylbenzene sulfonic acid, toluenesulfonic acid or benzenesulfonic acid); an organic acid such as a phosphate compound, or an inorganic acid such as hydrochloric acid, bromic acid or sulfuric acid. Such acids may be used alone or as a mixture of two or more of them.

Among them, preferred is a carboxylic acid, and particularly preferred is octylic acid.

In the production method (b), the molar ratio of the tertiary amine to the carbonic acid diester is usually 1:(0.3 to 4). A solvent (such as methanol or ethanol) may be used for the reaction as the case requires. The reaction temperature is usually from 30 to 150° C., preferably from 50 to 100° C.

In the production method (b), the anion-exchange reaction of the quaternary ammonium carbonate with an acid can be carried out in the presence or absence of a solvent. By removing carbon dioxide which is formed as a byproduct and the alcohol if necessary, from the reaction system, it is possible to quantitatively obtain the quaternary ammonium salt (B-1) wherein the $X^2$ is an organic acid ion or an inorganic acid ion. After the reaction, the reaction solvent is distilled if necessary, and can be used as it is, or it can be used as an aqueous solution or an organic solvent solution. The organic solvent may, for example, be methanol, ethanol, acetone, (poly)ethylene glycol, (poly)propylene glycol, γ-butyrolactone or N-methylpyrrolidone.

In the anion-exchange reaction of the quaternary ammonium carbonate with an acid, the amount of the acid to be used is preferably from 0.5 to 4 mol based on 1 mol of the quaternary ammonium carbonate, and the anion-exchange reaction is particularly preferably carried out in such a blend ratio that the pH of the aqueous solution or the organic solvent solution of the obtained quaternary ammonium salt (B-1) will be from 6.5 to 7.5.

Among the components (B) represented by the formula (2), specific examples of a quaternary ammonium (B-2) wherein the $X^2$ is a hydroxyl group may be triethyl methylammonium hydroxide, trimethyl benzylammonium hydroxide, hexyl trimethylammonium hydroxide, octyl trimethylammonium hydroxide, decyl trimethylammonium hydroxide, dodecyl trimethylammonium hydroxide, octyl dimethyl ethylammonium hydroxide, decyl dimethyl ethylammonium hydroxide, dodecyl dimethyl ethylammonium hydroxide, dihexyl dimethylammonium hydroxide, dioctyl dimethylammonium hydroxide, didecyl dimethylammonium hydroxide and didodecyl dimethylammonium hydroxide. They are available as commercial products.

Among them, trimethyl benzylammonium hydroxide is preferred.

In the present invention, the components (B) may be used alone or in combination as a mixture of two or more of them. Further, it is possible to use either one of the quaternary ammonium salt (B-1) wherein the $X^2$ is an organic acid ion or an inorganic acid ion, or the quaternary ammonium salt (B-2) wherein the $X^2$ is a hydroxyl group, or they may be used in combination.

In the curable composition of the present invention, the component (B) functions as a curing catalyst. When the component (B) is used as a curing catalyst, after the cured composition is applied, the initial rising of hardness is large, and the curable composition is quickly cured. Further, the cured product after the curing will be excellent in its surface smoothness and also in durability.

The amount of the component (B) in the curable composition of the present invention to be used is preferably from 0.1 to 10 parts by mass, more preferably from 0.5 to 5 parts by mass, per 100 parts by mass of the component (A) or per 100 parts by mass in total of the component (A) and a component (C) when the component (C) which will be described later is contained. When the amount of the component (B) to be used is at least 0.1 part by mass, curing proceeds sufficiently, and when it is at most 10 parts by mass, the strength of the curable composition rarely decreases.

Acrylic Polymer (C)

The curable composition of the present invention may contain an acrylic polymer (C) (hereinafter sometimes referred to as a component (C)) having a reactive silicon group represented by the following formula (4) and containing an alkyl (meth)acrylate monomer unit:

$$-SiX^{41}{}_{b}R^{41}{}_{3-b} \qquad (4)$$

wherein $R^{41}$ is a $C_{1-20}$ monovalent organic group which may have a substituent, $X^{41}$ is a hydroxyl group or a hydrolyzable group, and b is an integer of from 1 to 3; provided that when plural $R^{41}$s are present, they may be the same or different from one another, and when plural $X^{41}$s are present, they may be the same or different from one another.

The acrylic polymer (C) contains the alkyl (meth)acrylate monomer unit as an essential component. It may be a polymer containing only the alkyl (meth)acrylate monomer unit as monomer units or a polymer further containing an unsaturated group-containing monomer in addition. Here, the polymer containing the alkyl (meth)acrylate monomer unit means a polymer having repeating units derived from an alkyl (meth) acrylate. The polymer can be obtained by a polymerization reaction of an unsaturated group-containing monomer which contains is an alkyl (meth)acrylate monomer as an essential component. Further, in the present invention, the unsaturated group-containing monomer means a compound having an unsaturated bond (preferably a carbon-carbon double bond), which can form a polymer, and the alkyl (meth)acrylate means alkyl acrylate or an alkyl methacrylate, or a mixture of them.

The type or number of the alkyl (meth)acrylate monomer unit to be contained in the acrylic polymer (C) are not limited.

Specifically, the acrylic polymer (C) preferably contains an alkyl (meth)acrylate monomer represented by the following formula (9), as monomer units:

$$CH_2=CR^9COOR^{10} \qquad (9)$$

In the formula (9), $R^9$ is a hydrogen atom or a methyl group, and $R^{10}$ is an alkyl group which may be substituted by "a hydrocarbon group other than an alkyl group".

$R^{10}$ may be a linear or branched alkyl group or an alkyl group having a cyclic structure such as a cycloalkylalkyl group. Further, $R^{10}$ may be an alkyl group wherein at least one hydrogen atom of the alkyl group is substituted by "a hydrocarbon group other than an alkyl group" such as an aryl group.

The acrylic polymer (C) may be one having only one type or at least two types of the alkyl (meth)acrylate monomer represented by the formula (9) as monomer units, or it may be one further containing one type or at least two of the unsaturated group-containing monomer other than the monomer, as monomer units. Based on the entire acrylic polymer (C), the proportion of the monomer units derived from the alkyl (meth)acrylate is preferably at least 50 mass %, more preferably at least 70 mass %.

The acrylic polymer (C) is preferably a polymer (C-1) containing an alkyl (meth)acrylate monomer unit having a $C_{1-8}$ alkyl group as $R^{10}$, and an alkyl (meth)acrylate monomer unit having the alkyl group having at least 10 carbon atoms, or it is preferably a polymer (C-2) containing an alkyl (meth) acrylate monomer unit having a $C_{1-2}$ alkyl group as $R^{10}$ and an alkyl (meth)acrylate monomer unit having an alkyl group having from 3 to 10 carbon atoms, more preferably from 3 to 6 carbon atoms. With respect to each of the acrylic polymers (C-1) and (C-2), the acrylic polymer (C) is excellent in compatibility with the oxyalkylene polymer (A). Therefore, by using the (C-1) and/or (C-2), the characteristics such as mechanical strength, etc. of the curable composition after the curing will be further improved.

In the polymer (C-1), the alkyl (meth)acrylate monomer having an alkyl group having at least 10 carbon atoms is more preferably an alkyl (meth)acrylate monomer having a $C_{10-30}$ alkyl group, further preferably an alkyl (meth)acrylate monomer having a $C_{10-22}$ alkyl group.

Specific examples of the alkyl (meth)acrylate monomer may be methyl (meth)acrylate, ethyl (meth)acrylate, propyl (meth)acrylate, n-butyl (meth)acrylate, isobutyl (meth)acrylate, tert-butyl (meth)acrylate, n-hexyl (meth)acrylate, n-heptyl (meth)acrylate, isoheptyl (meth)acrylate, n-octyl (meth) acrylate, 2-ethylhexyl (meth)acrylate, isooctyl (meth) acrylate, n-nonyl (meth)acrylate, isononyl (meth)acrylate, cyclohexyl (meth)acrylate, decyl (meth)acrylate, dodecyl (meth)acrylate, tetradecyl (meth)acrylate, hexadecyl (meth) acrylate, octadecyl (meth)acrylate, eicosanyl (meth)acrylate, docosanyl (meth)acrylate and hexacosanyl (meth)acrylate.

In the polymer (C-1), the alkyl (meth)acrylate monomer having a $C_{1-8}$ alkyl group/the alkyl (meth)acrylate monomer having an alkyl group having at least 10 carbon atoms (mass ratio) is preferably from 95/5 to 40/60.

In the polymer (C-2), the alkyl (meth)acrylate monomer having a $C_{1-2}$ alkyl group/the alkyl (meth)acrylate monomer having a $C_{3-10}$ alkyl group (mass ratio) is preferably from 97/3 to 50/50.

The acrylic polymer (C) may have, for example, the following acrylic monomer copolymerized other than the alkyl (meth)acrylate monomer represented by the formula (9). That is, the acrylic monomer may, preferably, be methacrylic acid, a hydroxyalkyl (meth)acrylate such as hydroxyethyl (meth) acrylate; an isocyanate alkyl (meth)acrylate such as isocyanate ethyl (meth)acrylate; a phenoxyalkyl (meth)acrylate such as 2-phenoxyethyl (meth)acrylate; a (meth)acrylate having a (hydrogenated)furfuryl group such as furfuryl (meth)acrylate or tetrahydrofurfuryl (meth)acrylate; a (meth)acryloyloxy alkyl alkoxysilane such as 3-methacryloyloxypropyl trimethoxysilane; or a methacrylate of polyalkylene oxide monool such as glycidyl (meth)acrylate or methoxypolyethylene glycol (meth)acrylate.

The acrylic polymer (C) may contain monomer units derived from an unsaturated group-containing monomer other than the above-described ones. For example, such an unsaturated group-containing monomer may, preferably, be an N-substituted or N,N-substituted (meth)acrylamide such as N,N-dimethylacrylamide; an unsaturated glycidyl ether such as vinyl glycidyl ether, allyl glycidyl ether or methallyl glycidyl ether; a glycidyl ester of an unsaturated monocarboxylic acid such as glycidyl crotonate, glycidyl cinnamate or glycidyl vinylbenzoate; a monoalkyl monoglycidyl ester or diglycidyl ester of an unsaturated dicarboxylic acid; a styrene monomer such as styrene, α-methylstyrene or chlorostyrene; a cyano group-containing monomer such as acrylonitrile or 2,4-dicyanobutene-1; a vinyl ester monomer such as vinyl acetate or vinyl propionate; a diene monomer such as butadiene, isoprene or chloroprene; an olefin; a halogenated olefin; an unsaturated ester; or vinyl ether.

The acrylic polymer (C) can be obtained by polymerizing the above unsaturated group-containing monomer containing an alkyl (meth)acrylate monomer as an essential component by radical polymerization, anionic polymerization, cationic polymerization, etc. Particularly preferred is radical polymerization, and its mode may be any one of solution polymerization, emulsion polymerization, suspension polymerization and bulk polymerization.

When the acrylic polymer (C) is produced by radical polymerization, a polymerization initiator is usually added as a radical generation source to the unsaturated group-containing monomer. As such a polymerization initiator, the same one as mentioned in the description about the reaction of a polyoxyalkylene chain-containing polymer having unsaturated groups with the mercapto compound, is used. Further, when activation is carried out by radiation or heat, the polymerization initiator is not necessarily required. Further, the above reaction is preferably carried out at a temperature of from 20 to 200° C., more preferably from 50 to 150° C., and the reaction time is preferably from a few hours to several tens hours.

Further, in the radical polymerization, it is possible to use a chain transfer agent for the purpose of controlling the molecular weight, etc. The chain transfer agent may, for example, be an alkyl mercaptan such as n-dodecylmercaptan, t-dodecylmercaptan or n-butylmercaptan, or an α-methylstyrene dimer.

The acrylic polymer (C) may preliminarily be prepared by the above method such as radical polymerization, and then, it may be mixed with other components to obtain the curable composition. Otherwise, the acrylic polymer (C) may be formed by polymerizing the unsaturated group-containing monomer in the presence of other components in the curable composition. In such a case, it is preferred to polymerize the unsaturated group-containing monomer in the presence of the oxyalkylene polymer (A). It is thereby possible to omit a step of mixing, and it becomes easy to uniformly disperse the acrylic polymer (C) in the oxyalkylene polymer (A). Further, in the step of polymerization, a part of the unsaturated group-containing monomer may undergo graft polymerization with the oxyalkylene polymer (A) having a reactive silicon group. In such a case, the graft polymerized product functions as a compatibilizing agent, and the dispersibility of the acrylic polymer (C) is further improved.

The acrylic polymer (C) has at least one reactive silicon group represented by the formula (4) at least at its terminal or side chain.

For $R^{41}$ in the formula (4), it is possible to use the same one for $R^1$ in the formula (1), and the preferred mode is also the same.

For $X^{41}$ in the formula (4), it is possible to use the same one for $X^1$ in the formula (1), and the preferred mode is also the same.

b in the formula (4) is the same as a in the formula (1), and the preferred mode is also the same.

In the curable composition of the present invention, a reactive silicon group of the oxyalkylene polymer (A) and a reactive silicon group of the acrylic polymer (C) may be the same or different.

A method of introducing a reactive silicon group to the acrylic polymer (C) may, for example, be the following methods (i), (ii), (iii) and (iv). Further, it may be carried out by combining plural methods selected from these methods.

(i): A method wherein during the synthesis of the acrylic polymer (C) by polymerizing the unsaturated group-containing polymer, the unsaturated group-containing monomer having a reactive silicon group represented by the formula (4) is copolymerized therewith.

(ii): A method wherein during the synthesis of the acrylic polymer (C) by polymerizing the unsaturated group-containing polymer, a chain transfer agent having a reactive silicon group represented by the formula (4) is used.

(iii): A method wherein during the synthesis of the acrylic polymer (C) by polymerizing the unsaturated group-containing polymer, an initiator having a reactive silicon group represented by the formula (4) is used.

(iv): A method wherein an acrylic polymer having a functional group such as a hydroxyl group, an amino group, a carboxy group, an isocyanate group or an epoxy group, is synthesized, and it is reacted with a compound having a functional group reactive with the functional group of the polymer and a reactive silicon group represented by the formula (4).

The unsaturated group-containing monomer having a reactive silicon group represented by the formula (4), which is used in the method (1), is preferably a compound represented by the following formula (10):

$$R^{13}-SiX^{41}{}_bR^{41}{}_{3-b} \qquad (10)$$

In the formula (10), $R^{13}$ is a monovalent organic group having an unsaturated group. $R^{41}$, $X^{41}$ and b in the formula (10) have the same meanings as in the formula (4).

Specific examples of the compound represented by the formula (10) may, preferably, be a vinylsilane such as vinyl methyl dimethoxysilane, vinyl methyl diethoxysilane, vinyl methyl dichlorosilane, vinyl trimethoxysilane, vinyl triethoxysilane, vinyl trichlorosilane or tris(2-methoxyethoxy)vinylsilane; and a (meth)acryloyloxysilane such as 3-acryloyloxypropyl methyl dimethoxysilane, 3-methacryloyloxypropyl methyl dimethoxysilane, 3-acryloyloxypropyl trimethoxysilane, 3-acryloyloxypropyl triethoxysilane, 3-methacryloyloxy propyl trimethoxysilane or 3-methacryloyloxypropyl triethoxysilane.

In the method (i), the amount of the unsaturated group-containing monomer having the reactive silicon group represented by the formula (4), to be used is preferably from 0.01 to 20 parts by mass per 100 parts by mass of the total monomers to be used to synthesize the acrylic polymer (C).

The chain transfer agent having the reactive silicon group represented by the formula (4), to be used in the method (ii), is preferably a compound represented by the following formula (11) or a compound represented by the following formula (12):

$$HS-R^{14}-SiX^{41}{}_bR^{41}{}_{3-b} \qquad (11)$$

In the formula (11), $R^{14}$ is a single bond or a divalent organic group. $R^{41}$, $X^{41}$ and b have the same meanings as in the formula (4).

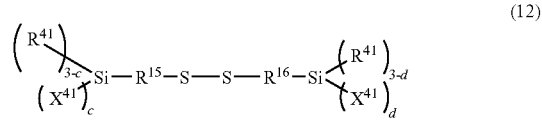

(12)

In the formula (12), $R^{41}$ and $X^{41}$ have the same meanings as in the formula (4). Each of $R^{15}$ and $R^{16}$ is a single bond or a divalent organic group, and each of c and d is independently an integer of from 1 to 3.

A specific example of the compound represented by the formula (11) may, preferably, be a mercapto compound having a reactive silicon group such as 3-mercaptopropyl trimethoxysilane, 3-mercaptopropyl methyl dimethoxysilane, 3-mercaptopropyl triethoxysilane, 3-mercaptopropyl methyl diethoxysilane or 3-mercaptopropyl triisopropenyloxysilane. Specific examples of the compound represented by the formula (12) may, preferably be $(CH_3O)_3Si-S-S-Si(OCH_3)_3$ and $(CH_3O)_3Si-(CH_2)_3-S-S-(CH_2)_3-Si(OCH_3)_3$.

The number average molecular weight Mn of the acrylic polymer (C) is preferably from 500 to 100,000, more preferably from 1,000 to 100,000. If Mn of the acrylic polymer (C) exceeds 100,000, the workability tends to be deteriorated, and if Mn is less than 500, the physical properties after the curing tends to be deteriorated.

It is considered that when the curable composition is to be cured, the reactive silicon group of the acrylic polymer (C) reacts with the reactive silicon group of the oxyalkylene polymer (A) and forms a bond, and as a result, the mechanical strength of a cured product after the curing will be improved, and the durability of the curable composition and its cured product will also be improved.

Specifically, the acrylic polymer (C) preferably has the reactive silicon group at its terminal. Consequently, it is possible to further improve the elongation characteristic of the curable composition after the curing. Such an acrylic polymer (C) having a reactive silicon group at its terminal can be obtained by e.g. the method (ii) or the method (iii).

By incorporating the acrylic polymer (C) in the curable composition of the present invention, the mechanical strength of a cured product after the curing will be improved, and the durability of the curable composition and its cured product will also be improved.

When the acrylic polymer (C) is incorporated in the curable composition of the present invention, the amount to be incorporated is preferably from 5 to 70 parts by mass, more preferably from 20 to 60 parts by mass, per 100 parts by mass in total of the oxyalkylene polymer (A) and the acrylic polymer (C). When the proportion of the incorporated amount of the acrylic polymer (C) is at least 5 parts by mass, the addition effect of the component (C) can sufficiently be obtained, and when it is at most 70 parts by mass, the proper viscosity of the curable composition can be obtained, whereby the workability will be good.

Other Components

In addition to the components (A) to (C), the curable composition may contain, as the case requires, a curing accelerator, a filler, a plasticizer, a dehydrator, a thixotropic agent and an age resister, which will be described below. Further, other than these, the curable composition may contain a surface modifier; a solvent; a modulus adjustor such as a compound which forms trimethylsilanol by hydrolysis, such as phenoxytrimethylsilane; a compound curable by air such as a wood oil; a compound curable by light such as trimethylolpropane triacrylate; an inorganic pigment such as iron oxide, chromium oxide or titanium oxide; and an organic pigment such as phthalocyanine blue or phthalocyanine green. The use of a pigment is effective not only for coloration but also for the purpose of improving weather resistance. Further, it is also possible to add a known flame retardant or fungus resister to the curable composition. A flatting agent used for an application to coating material, may also be added. If necessary, the curable composition may contain other additives than the above.

Curing Accelerator

As the curing accelerator, for example, a tin compound is mentioned. The tin compound may, for example, be a divalent tin compound, such as tin 2-ethylhexanoate, tin naphthenate or tin stearate; or a tetravalent tin compound, such as an organic tin carboxylate such as a dialkyltin dicarboxylate such as dibutyltin dilaurate, dibutyltin diacetate, dibutyltin monoacetate or dibutyltin maleate, or a dialkoxytin monocarboxylate, a tin chelating compound such as a dialkyltin bisacetylacetonate or a dialkyltin monoacetylacetonate monoalkoxide, a reaction product of the alkyltin oxide and an ester compound, a reaction product of a dialkyltin oxide and an alkoxysilane compound, or a dialkyltin dialkylsulfide.

The tin chelating compound may, for example, be dibutyltin bisacetylacetonate, dibutyltin bisethylacetoacetate or dibutyltin monoacetylacetonate monoalkoxide.

The reaction product of a dialkyltin oxide and an ester compound may be a tin compound made into a liquid in such a manner that a dibutyltin oxide and a phthalate such as dioctyl phthalate or diisonyl phthalate are heated and mixed to undergo a reaction. In such a case, as the ester compound, it is also possible to use an aliphatic or aromatic carboxylate other than the phthalate, tetraethylsilicate or its partially hydrolyzed condensate. Further, a compound obtained by reacting or mixing the tin compound with a low-molecular-weight alkoxysilane, is also suitably used.

Other than the tin compound, the curing accelerator may, for example, be a divalent bismuth compound such as an organic carboxylic bismuth salt; an acidic compound such as phosphoric acid, p-toluenesulfonic acid, phthalic acid or di-2-ethylhexyl phosphate; an amine compound, such as an aliphatic monoamine such as butylamine, hexylamine, octylamine, decylamine, laurylamine or N,N-dimethyloctylamine, an aliphatic polyamine compound such as ethylenediamine, hexamethylenediamine, diethylenetriamine, triethylenetetramine or tetraethylenepentamine, an aromatic amine compound, or an alkanolamine; or an organic titanate compound.

The divalent tin compound or the divalent bismuth compound is preferably used in combination with a primary amine compound in order to improve the curing acceleration effect. The curing accelerators may be used alone or in combination as a mixture of two or more of them.

The curable composition of the present invention has a suitable curing rate without incorporating a curing accelerator so that substantially no curing accelerator may be incorporated. When the curing accelerator is used, it is possible to further improve the curing rate.

The amount of the curing accelerator to be used when it is used, is preferably from 0.1 to 10.0 parts by mass, more preferably from 0.5 to 5 parts by mass per 100 parts by mass in total of the oxyalkylene polymer (A) and the acrylic polymer (C).

Filler

Specific examples of the filler may be calcium carbonate such as heavy calcium carbonate having an average particle size of from 1 to 20 µm, light calcium carbonate produced by a sedimentation method and having an average particle size of from 1 to 3 µm, colloidal calcium carbonate having its surface treated with an aliphatic acid or a resin acid type organic product, or slight calcium carbonate; fumed silica; sedimentatable silica; silica fine powder having its surface treated with silicon; silicic anhydride; silicic hydride; carbon black; magnesium carbonate; diatomaceous earth; calcined clay; talc; titanium oxide; bentonite; ferric oxide; zinc oxide; active zinc oxide; a hollow body such as shriasu balloon, perlite, glass balloon, silica balloon, fly ash balloon, alumina balloon, zirconium balloon or carbon balloon; an organic resin hollow body such as phenol resin balloon, epoxy resin balloon, urea resin balloon, polyvinylidene chloride resin balloon, polyvinylidene chloride/acrylic resin balloon, polystyrene balloon, polymethacrylate balloon, polyvinyl alcohol balloon, styrene/acrylic resin balloon or polyacrylonitrile balloon; a powder filler such as resin beads, wood flour, pulp, cotton chip, mica, walnut shell flour, rice hull flour, graphite, aluminum fine powder or flint powder; and a fibrous filler such as glass fiber, glass filament, carbon fiber, kepler fiber or polyethylene fiber. Such fillers may be used alone or in combination as a mixture of two types or more of them.

Among them, calcium carbonate is preferred, and it is particularly preferred to use heavy calcium carbonate and colloidal carbonate in combination.

Further, since it is possible to reduce the weight of the curable composition and its cured product, it is preferred to use a hollow body as the filler. Further, by using the hollow body, it is possible to improve the stringiness of the composition and to improve the workability. The hollow body may be used alone, but it may be used in combination with another filler such as calcium carbonate.

Plasticizer

The plasticizer may, for example, be a phthalate such as dioctyl phthalate, dibutyl phthalate, butylbenzyl phthalate or isononyl phthalate; an aliphatic carboxylate such as diocyl adipate, diisodecyl succinate, dibutyl sebacate or butyl oleate; an alcoholic ester such as pentaerythritol ester; a phosphate such as trioctyl phosphate or tricresyl phosphate; an epoxy plasticizer such as epoxidized soybean oil, dioctyl 4,5-epoxyhexahydrophthalate or benzylepoxystearate; chlorinated paraffin; a polyester plasticizer such as a polyester obtained by reacting a dibasic acid with a divalent alcohol; or a polymer plasticizer such as polyoxypropylene glycol or its derivative, for example, a polyether wherein hydroxyl groups of the polyoxypropylene glycol are sealed with an alkyl ether, or a polystyrene oligomer such as poly-α-methylstyrene or polystyrene, or an oligomer such as polybutadiene, a butadiene-acrylonitrile copolymer, polychloroprene, polyisoprene, polybutene, hydrogenated polybutene or epoxidized polybutadiene. Such plasticizers may be used in combination of at least two types of them, for example a phthalate and an epoxy plasticizer.

Dehydrator

To the curable composition, in order to further improve the storage stability, a small amount of a dehydrator can be added within a range where the curability or flexibility is not adversely affected. The dehydrator may, for example, be an alkyl orthoformate such as methyl orthoformate or ethyl orthoformate, an alkyl orthoacetate such as methyl orthoacetate or ethyl orthoacetate, a hydrolyzable organic silicon compound such as methyltrimethoxysilane, vinyltrimethoxysilane, tetramethoxysilane or a hydrolyzable organic titanium compound. Among them, vinyltrimethoxysilane and tetraethoxysilane are particularly preferred from the viewpoint of their costs and effects. Especially when the curable composition is handled as a product known as one-pack type wherein the curable composition is filled in a moisture proof container in a state of containing a curing accelerator, it is effective to use such a dehydrator.

Thixotropic Agent

By incorporating a thixotropic agent, the sagging property of the curable composition is remedied. The thixotropic agent may, for example, be a hydrogenated castor oil or fatty acid amide, and it is used in an optional amount.

Age Resister

As an age resister, one generally used as an antioxidant, an ultraviolet absorber or a light stabilizer can suitably be used. Specifically, each compound of a hindered amine type, a benzotriazole type, a benzophenone type, a benzoate type, a cyanoacrylate type, an acrylate type, a phosphorus type and a sulfur type can suitably be used as the age resister. Particularly, it is preferred to use two or all of the light stabilizer, the antioxidant and the ultraviolet absorber in combination since the characteristics of the respective ones can be effective as a whole. Specifically, it is preferred to combine a tertiary or secondary hindered amine type light stabilizer, a benzotriazole type ultraviolet absorber and a hindered phenol and/or phosphite type antioxidant.

Adhesion-Imparting Agent

Specific examples of an adhesion-imparting agent may be an organic silane coupling agent such as silane having a (meth)acryloyloxy group, silane having an amino group, silane having an epoxy group or silane having a carboxy group; an organic metal coupling agent such as isopropyl tri(N-aminoethyl-aminoethyl)propyl trimethoxytitanate or 3-mercaptopropyl trimethoxytitanate; and an epoxy resin.

Specific examples of silane having an amino group may be 3-aminopropyl trimethoxysilane, 3-aminopropyl triethoxysilane, 3-aminopropyl methyl dimethoxysilane, N-(2-aminoethyl)-3-aminopropyl trimethoxysilane, N-(2-aminoethyl-3-aminopropyl methyl dimethoxysilane, N-(2-aminoethyl)-3-aminopropyl triethoxysilane, 3-ureidopropyl triethoxysilane, N—(N-vinylbenzyl-2-aminoethyl)-3-aminopropyl trimethoxysilane and 3-anilinopropyl trimethoxysilane.

Specific examples of the epoxy resin may be a bisphenol A-diglycidyl ether type epoxy resin, bisphenol F-diglycidyl ether type epoxy resin, a tetrabromobisphenol A-glycidyl ether type epoxy resin, a novolak type epoxy resin, a hydrogenated bisphenol A type epoxy resin, a glycidyl ether type epoxy resin of a bisphenol A-propylene oxide adduct, glycidyl 4-glycidyloxybenzoate, diglycidyl phthalate, diglycidyl tetrahydrophthalate, diglycidyl hexahydrophthalate, a diglycidyl ester type epoxy resin, an m-aminophenol type epoxy resin, a diaminodiphenylmethane type epoxy resin, a urethane modified epoxy resin, N,N-diglycidyl aniline, N,N-diglycidyl-o-toluidine, triglycidyl isocyanurate, polyalkylene glycol diglycidyl ether, glycidyl ether of a polyhydric alcohol (e.g. glycerol), a hydantoin epoxy resin and an unsaturated polymer (e.g. a petroleum resin) epoxy resin.

When the silane coupling agent is added to the curable composition, its amount to be added is preferably from 0.1 to 30 parts by mass per 100 parts by mass in total of the oxyalkylene polymer (A) and the acrylic polymer (C).

When the epoxy resin is added to the curable composition, its amount to be added is preferably at most 100 parts by mass, more preferably from 10 to 80 parts by mass, per 100 parts by mass in total of the oxyalkylene polymer (A) and the acrylic polymer (C).

EXAMPLES

Now, the present invention will be described in further detail with reference to Examples of the present invention and Comparative Examples, but it should be understood that the present invention is by no means restricted thereto.

Production Examples

The oxyalkylene polymer (A), the quaternary ammonium salt (B) and the acrylic polymer (C) were produced as follows. Further, in the following Production Examples, the reaction for synthesis was carried out by using an inner temperature-adjustable pressure proof rector equipped with a nitrogen supply tube and a stirring device.

Production Example 1

Production of Oxyalkylene Polymer (A1)

Propylene oxide (hereinafter referred to as "PO") was reacted with polyoxypropylene triol (Mn: 1,000) as an initiator in the presence of a zinc hexacyanocobaltate/glyme complex catalyst to obtain polyoxypropylene triol having Mn of 17,000 and Mw/Mn of 1.4. To the polyoxypropylene triol, a methanol solution containing sodium methoxide in an amount of 1.05 mol based on 1 mol of hydroxyl groups in the polyoxypropylene triol, was added. Then, by distilling methanol by heating at a temperature of 120° C. under a reduced pressure, hydroxyl groups of the polyoxypropylene triol were converted to sodium alkoxide, and then, allyl chloride was added and reacted in an amount of 1.05 times by mol of the added sodium methoxide. After removing the unreacted allyl chloride, an inorganic salt formed as a byproduct was removed to obtain an oxypropylene polymer having an allyl group at its terminal and having a viscosity of 7.0 Pa·s (25° C.).

Further, such an allyl group terminal oxypropylene polymer was reacted with methyldimethoxysilane in the presence of a platinum catalyst to obtain an oxypropylene polymer (A) having a methyldimethoxysilyl group at its terminal (hereinafter referred to as "the oxyalkylene polymer (A1)").

The obtained oxyalkylene polymer (A1) had a viscosity of 9.0 Pa·s (25° C.), Mn of 17,000 and Mw/Mn of 1.4

Production Example 2

Production of Oxyalkylene Polymer (A2)

Into a reactor containing, as an initiator, a mixture of 120 g of polyoxypropylene diol (Mn: 3,000) (hereinafter referred to as "diol A") and 200 g of polyoxypropylene triol (Mn: 5,000) (hereinafter referred to as "triol B"), 2,480 g of PO was gradually added in is the presence of 1.2 g of a zinc hexacyanocobaltate/glyme complex catalyst, while heating to 120° C. to carry out a polymerization reaction. After the entire amount of PO was added thereto, the reaction was further proceeded until the inner pressure of the reactor no longer decreased. Continuously, 120 g of diol A and 200 g of triol B were introduced into the reactor, and after 1,680 g of PO was gradually added thereto in the same manner as above, the reaction was proceeded until the inner pressure of the reactor no longer decreased. Further, 120 g of diol A and 200 g of triol B were introduced into the reactor, and after 1,280 g of PO was gradually added thereto in the same manner as above, the reaction was proceeded until the inner pressure of the reactor no longer decreased. Furthermore, 80 g of diol A and 130 g of triol B were introduced into the reactor, and after 590 g of PO was gradually added thereto in the same manner as above, the reaction was proceeded until the inner pressure of the reactor no longer decreased to obtain a polymerization intermediate.

To the obtained polymerization intermediate, 60 g of diol A and 100 g of triol B were added, and after 240 g of PO was gradually added thereto in the same manner as above, the reaction was proceeded until the inner pressure of the reactor no longer decreased. Lastly, 75 g of diol A and 125 g of triol B were added thereto, and after 200 g of PO was gradually added thereto in the same manner as above, the reaction was proceeded until the inner pressure of the reactor no longer decreased. By the above operations, polyoxypropylene polyol having Mn of 17,000, Mw/Mn of 1.8 and a viscosity of 19.5 Pa's (25° C.) was obtained.

By using the obtained polyoxypropylene polyol, in the same manner as in Production Example 1, an allyl group terminal oxypropylene polymer was obtained.

Further, such an allyl group terminal oxypropylene polymer was reacted with methyldimethoxysilane in the presence of a platinum catalyst to obtain an oxypropylene polymer having a methyldimethoxysilyl group at its terminal (hereinafter referred to as "the oxyalkylene polymer (A2)").

The obtained oxyalkylene polymer (A2) had a viscosity of 20.0 Pa·s (25° C.), Mn of 17,000 and Mw/Mn of 1.8.

Production Example 3

Production of Oxyalkylene Polymer (A3)

In this Example, by a method of carrying out a urethanization reaction of the polymer (pP) having a polyoxyalkylene chain and hydroxyl groups with the isocyanate compound (U), the oxyalkylene polymer (A) was produced.

In the presence of a zinc hexacyanocobaltate/glyme complex catalyst, PO was subjected to ring-opening polymerization with the polyoxypropylene diol (Mn: 1,000) to obtain a polyoxyalkylene diol (Mn: 16,000 and hydroxyl value: 7.7) (polymer (P-1)). In a pressure-proof reactor (inner volume: 5 L), 3,000 of the polymer (P-1) was introduced, and while maintaining the inner temperature at 110° C., dehydration under a reduced pressure was carried out. Then, the atmosphere in the reactor was flushed with nitrogen gas, and while maintaining the inner temperature at 50° C., 86.1 g of 3-isocyanate propylene trimethoxysilane (purity: 95%) was introduced thereto so that NCO/OH became 0.97. Further, the inner temperature was maintained at 80° C. for 8 hours, and the polymer (P-1) and 3-isocyanate propyltrimethoxysilane were subjected to a urethanization reaction to obtain an oxypropylene polymer having a trimethoxysilyl group at its terminal (hereinafter referred to as "the oxyalkylene polymer (A3)").

The obtained oxyalkylene polymer (A3) had a viscosity of 20.0 Pa·s (25° C.), Mn of 16,100 and Mw/Mn of 1.38.

Production Example 4

Production of Oxyalkylene Polymer (A4)

The polymerization intermediate obtained in Production Example 2, 80 g of diol A and 130 g of triol B were put into a reactor, and after 590 g of PO was gradually added thereto in the same manner as above, the reaction was proceeded until the inner temperature of the reactor no longer decreased. Further, 160 g of diol A was added thereto, and after 240 g of PO was gradually added thereto in the same manner as above, the reaction was proceeded until the inner pressure of the reactor no longer decreased. Lastly, 200 g of polyoxypropylene monool (Mn: 5,000) (a polymerized product having a molecular weight of 5,000, which was obtained by polymerization by adding PO and using butyl alcohol as an initiator) was added thereto, and after 200 g of PO was gradually added thereto in the same manner as above, the reaction was proceeded until the inner pressure of the reactor no longer decreased. By the above operations, polyoxypropylene polyol having Mn of 18,000, Mw/Mn of 1.75 and a viscosity of 18.5 Pa·s (25° C.) was obtained.

By using the obtained polyoxypropylene polyol, an allyl group terminal oxypropylene polymer was obtained in the same manner as in Production Example 1.

Further, such an allyl group terminal oxypropylene polymer was reacted with methyldimethoxysilane in the presence of a platinum catalyst to obtain an oxypropylene polymer having a methyldimethoxysilyl group at its terminal (hereinafter referred to as "the oxyalkylene polymer (A4)").

The obtained oxyalkylene polymer (A4) had a viscosity of 19.5 Pa·s (25° C.), Mn of 18,000 and Mw/Mn of 1.77.

Production Example 5

Production of Quaternary Ammonium Salt (B1)

Into an autoclave equipped with a stirrer, didecylmethylamine (1 mol), dimethylcarbonate (1.5 mol) and methanol (2.0 mol) as a solvent were introduced, and a reaction was carried out at a reaction temperature of 110° C. for 12 hours to obtain a methanol solution of dimethyldidecyl ammonium methylcarbonate. To this solution, octylic acid (1 mol) was added, and by removing carbon dioxide and methanol, which were formed as byproducts, dimethyl didecylammonium/octylate (quaternary ammonium salt (B1)) was obtained.

Production Example 6

Production of Quaternary Ammonium Salt (B2))

Into an autoclave equipped with a stirrer, triethylamine (1 mol), dimethylcarbonate (1.5 mol) and methanol (2.0 mol) as a solvent were introduced, and a reaction was carried out at a reaction temperature of 110° C. for 12 hours to obtain a methanol solution of methyltriethyl ammonium methylzarbonate. To this solution, octylic acid (1 mol) was added, and by removing carbon dioxide and methanol, which were formed as byproducts, methyltriethylammonium/octylate (quaternary ammonium salt (B2)) was obtained.

Production Example 7

Production of Acrylic Polymer (C1)

In this Example, the acrylic polymer (C) was produced by a method of polymerizing an unsaturated group-containing monomer to constitute the acrylic polymer (C) in the presence of the oxyalkylene polymer (A1) obtained in Production Example 1.

Into a pressure-proof reactor equipped with a stirrer, 140 g of the oxyalkylene polymer (A1) was put, and the temperature was raised to about 67° C. By maintaining the inner temperature of the reactor at about 67° C., in an atmosphere of nitrogen, a solution mixture of 72 g of methyl methacrylate, 6.5 g of n-butyl acrylate, 29.0 g of n-butyl methacrylate, 15.0 g of 3-methacryloxypropyl triethoxysilane, 14.0 g of normal dodecylmercaptan and 2.5 g of 2,2'-azobis(2,4-dimethylvaleronitrile) (tradename: V65, manufactured by Wako Pure Chemical Industries, Ltd.), was dropwisely added with stirring into the oxyalkylene polymer (A1) over a period of 8 hours to carry out polymerization. In the presence of the oxyalkylene polymer (A1), a (meth)acrylate copolymer (hereinafter referred to as "the acrylic polymer (C1)") having a triethoxysilyl group as a reactive silicon group was synthesized. A "polymer mixture containing the oxyalkylene polymer (A1) and the acrylic polymer (C1)" obtained in such a manner was dissolved in hexane, and then, subjected to centrifugation, followed by extraction. The average molecular weight (Mn) of the acrylic polymer (C1) was measured, and it was 4,000.

EXAMPLES

By using the respective components obtained in the above Production Examples and commercial components, curable compositions were prepared to have the compositions shown in Tables 1 and 2, and the characteristics were evaluated. The unit for the blend proportions shown in Tables is "parts by mass".

Example 1

To 30 parts by mass of the oxyalkylene polymer (A1) obtained in Example 1, 0.1 part by mass of water, 20 parts by mass of bis-2-ethylhexyl phthalate (DOP) as a plasticizer, and 10 parts by mass of heavy calcium carbonate (tradename: "WHITON SB, manufactured by Shiraishi Calcium Kaisha, Ltd.) were added, followed by mixing uniformly, and then, 0.5 part by mass of the quaternary ammonium salt (B1) obtained in Production Example 5 was added thereto, followed by stirring and mixing uniformly to prepare a curable composition. Further, as the heavy calcium carbonate, one preliminarily heated at 120° C. for 12 hours and dried was used.

Examples 2 to 7 and Comparative Examples 1 to 4

A curable composition was prepared in the same manner as in Example 1 except that the composition shown in Table 1 was used.

Further, in Example 5, as the component (B), BTMAH-40 (benzyltrimethylammonium hydroxide: manufactured by Lion Akzo Co., Ltd.) was used.

Further, in Example 6, instead of 30 parts by mass of the oxyalkylene polymer (A1) in Example 1, 30 parts by mass of the "polymer mixture containing the oxyalkylene polymer (A1) and the acrylic polymer (C1)" obtained in Production Example 7, was used.

Examples 7 was carried out in the same manner as in Example 1 except that the oxyalkylene polymer (A) was changed to the polymer (A4).

Further, instead of the component (B), in Comparative Example 1, NO. 918 (a reaction product of dibutyltin oxide and bis-2-ethylhexyl phthalate: manufactured by Sankyo Yuki Gosei) as an organic tin catalyst, was used; in Comparative Example 2, NEOSTANN U-220H (dibutyltin bisacetylacetonate: manufactured by Nitto Kasei Co., Ltd.) as an organic tin catalyst, was used; and in Comparative Examples 3 and 4, 2-ethylhexanoic acid and 0.2 part by mass of laurylamine were used.

Evaluations
Curing Rate

Each of the curable compositions obtained in Examples 1 to 7 and Comparative Examples 1 to 4 was poured into a mold (thickness: 12 mm), and bubbles on the surface of the composition were removed by nitrogen spraying, followed by aging in a thermostatic chamber at 100° C. for 1 hour and then by cooling to room temperature (25° C.), and then the hardness was measured. After the hardness measurement, aging was further carried out in a thermostatic chamber of 65 RH % at 50° C. for 5 days to obtain a completely cured product. After that, the cured product was cooled to room temperature (25° C.), and then, the hardness was measured.

The measurement of the hardness was carried out by a method wherein a digital hardness meter DD2-C type (manufactured by Kobunshi Keiki Co., Ltd.) was used to measure 5 places, and the average value was calculated. The measurement results are shown in Table 1.

Further, the difference (the final hardness–the initial hardness) between the hardness (the initial hardness) after aging for 1 hour and the hardness (the final hardness) after aging for 5 days, was calculated. The results are shown in Table 1. The smaller the value of this difference in hardnesses, the shorter the time to reach the final hardness, which means that the curing rate is high.

Bleed Out State on Surface of Cured Product

In the same manner as in the evaluation method of the curing rate, the surfaces of cured products obtained by carrying out aging for 1 hour and aging for 5 days, were visually observed to check the presence or absence of bleeding out of a liquid product. As a result, a case where no bleeding out was observed, is shown as "none", and a case where bleeding out of a liquid product was observed is shown as "observed", in Table 1.

Surface State of Cured Product

In the same manner as in the above evaluation method of the curing rate, the surface of a cured product obtained by carrying out aging for 1 hour and aging for 5 days were visually observed to evaluate its smoothness. As a result, a case where the surface had no bubbles and was smooth, is shown as "good", and a case where bubbles were observed is shown as "bubbles observed" in Table 1.

TABLE 1

|  |  | Example | | | | | | |
| --- | --- | --- | --- | --- | --- | --- | --- | --- |
|  |  | 1 | 2 | 3 | 4 | 5 | 6 | 7 |
| Oxyalkylene | A1 | 30 |  |  | 30 | 30 |  |  |
| polymer (A) | A2 |  | 30 |  |  |  |  |  |
|  | A3 |  |  | 30 |  |  |  |  |

TABLE 1-continued

| | | | | | | | | |
|---|---|---|---|---|---|---|---|---|
| Acrylic polymer (C) | A4 Acrylic polymer (C1) + A1 | | | | | 30 | | 30 |
| Quaternary ammonium salt (B) | B1 | 0.6 | 0.6 | 0.6 | | | 0.6 | 0.6 |
| | B2 | | | | 0.6 | | | |
| | BTMAH-40 | | | | | 0.6 | | |
| Acid | 2ethylhexanoate | | | | | | | |
| Amine | Laurylamine | | | | | | | |
| Organic tin catalyst | No. 918 NEOSTANN U-220H | | | | | | | |
| Filler | WHITON SB | 10 | 10 | 10 | 10 | 10 | 10 | 10 |
| Plasticizer | DOP | 20 | 20 | 20 | 20 | 20 | 20 | 20 |
| Deionized water | H$_2$O | 0.1 | 0.1 | 0.1 | 0.1 | 0.1 | 0.1 | 0.1 |
| Hardness | After 100° C. for 1 hr | 31 | 34 | 38 | 30 | 34 | 15 | 34 |
| | After 100° C. for 1 hr + 50° C. × 5 days | 32 | 36 | 40 | 32 | 34 | 17 | 36 |
| | Difference between hardness | 1 | 2 | 2 | 2 | 0 | 2 | 2 |
| Bleed out state of curd product surface | | None | None | None | Observed | None | None | None |
| Surface state of cured product | | Good | Good | Good | Good | Good | Good | Good |

| | | Comparative Example | | | |
|---|---|---|---|---|---|
| | | 1 | 2 | 3 | 4 |
| Oxyalkylene polymer (A) | A1 | 30 | | 30 | |
| | A2 | | 30 | | 30 |
| | A3 | | | | |
| | A4 | | | | |
| Acrylic polymer (C) | Acrylic polymer (C1) + A1 | | | | |
| Quaternary ammonium salt (B) | B1 | | | | |
| | B2 | | | | |
| | BTMAH-40 | | | | |
| Acid | 2ethylhexanoate | | | 0.4 | 0.3 |
| Amine | Laurylamine | | | 0.2 | 0.3 |
| Organic tin catalyst | No. 918 | 0.6 | | | |
| | NEOSTANN U-220H | | 0.6 | | |
| Filler | WHITON SB | 10 | 10 | 10 | 10 |
| Plasticizer | DOP | 20 | 20 | 20 | 20 |
| Deionized water | H$_2$O | 0.1 | 0.1 | 0.1 | 0.1 |
| Hardness | After 100° C. for 1 hr | 35 | 31 | 23 | 21 |
| | After 100° C. for 1 hr + 50° C. × 5 days | 37 | 33 | 32 | 32 |
| | Difference between hardness | 2 | 2 | 9 | 11 |
| Bleed out state of curd product surface | | None | None | None | None |
| Surface state of cured product | | Good | Good | Bubbles observed | Bubbles observed |

As shown in Table 1, with respect to the curable compositions of Examples 1 to 7, it was observed that rising of hardness in the initial stage was large, and that the curing rate was high. On the other hand, in Comparative Examples 3 and 4 where an acid and amine were used in combination, without using the component (B), the curing rate was low. Further, bubbles were observed on the surface. It is assumed that carbon dioxide gas was formed by a reaction of the acid with calcium carbonate in the curable composition.

With respect to the curable compositions of Comparative Examples 1 and 2 where an organic tin compound was used without using the component (B), the curing rate and the surface state of a cured product were about the same levels as ones of Examples of the present invention.

Example 8

A curable composition was prepared to have the composition shown in Table 2.

To 100 parts by mass of the oxyalkylene polymer (A1) obtained in Production Example 1, 75 parts by mass of a surface-treated calcium carbonate (tradename: "Hakuenka CCR" manufactured by Shiraishi Kogyo) and 75 parts by mass of the above heavy calcium carbonate, as fillers, 40 parts by mass of bis-2-ethylhexyl phthalate (DOP) as a plasticizer, and 3 parts by mass of hydrogenated castor oil (tradename: "DISPARLON 6500" manufactured by Kusumoto Chemicals, Ltd.) as a thixotrooic agent, were added, followed by stirring and mixing by a planetary stirrer (manufactured by Kurabo Industries, Ltd.). Then, after the temperature was lowered to 25° C., 3 parts by mass of vinyl trimethoxysilane (tradename: "KBM-1003" manufactured by Shin-Etsu Chemical Co., Ltd.) as a dehydrator and adhesion-imparting agent (a silane coupling agent), 1 part by mass of N-(2-aminoethyl)-3-aminopropyl trimethoxysilane (tradename: "KBM-603" manufactured by Shin-Etsu Chemical Co., Ltd.) and 1 part by mass of 3-glycidoxypropyl trimethoxysilane (tradename: "KBM-403" manufactured by Shin-Etsu Chemical Co., Ltd.) were added thereto and uniformly mixed, and then, 2 parts by mass of the quaternary ammonium salt (B1) obtained in Production Example 4, as a curing catalyst was added thereto, followed by stirring and mixing to prepare a curable composition Examples 8 to 13 and Comparative Examples 5 to 8

A curable composition was prepared in the same manner as in Example 8 except that the composition was changed as shown in Table 2.

Further, in Example 12 and Comparative Example 8, instead of 100 parts by mass of the oxyalkylene polymer (A1) in Example 8, 100 parts by mass of "the polymer mixture containing the oxyalkylene polymer (A1) and the acrylic polymer (C1)" obtained in Production Example 7, was used.

Further, instead of the component (B), in Comparative Examples 5, 7 and 8, NO. 918 as an organic tin catalyst was used, and in Comparative Example 6, NEOSTANN U-220H as an organic tin catalyst was used.

Evaluation

Surface State of Cured Product after Cycle of Aging

Each of the curable compositions obtained in Examples 8 to 13 and Comparative Examples 5 to 8, was poured into a mold to form a sheet having a thickness of about 10 mm. The sheet was cured and aged for 7 days at 23° C. with a humidity of 50%, and then, it was aged for 7 days at 50° C. with a humidity of 65%. Further, the sheet was impregnated in warm water of 50° C. for 15 hours, followed by aging at 90° C. for 9 hours, and such a cycle of aging was repeated 10 times The surface of the cured product thus obtained was visually observed, and its surface state was evaluated. As a result, a case where the surface had no swelling and was smooth, is shown as "good", and a case where swelling was observed is shown as "swelling observed" in Table 2.

TABLE 2

|  |  | Example |  |  |  |  |  |
|---|---|---|---|---|---|---|---|
|  |  | 8 | 9 | 10 | 11 | 12 | 13 |
| Oxyalkylene polymer (A) | A1 | 100 | 100 | 100 |  |  |  |
|  | A2 |  |  |  |  |  |  |
|  | A3 |  |  |  | 100 |  |  |
|  | A4 |  |  |  |  |  | 100 |
| Acrylic polymer (C) | Acrylic polymer (C1) + A1 |  |  |  |  | 100 |  |
| Quaternary ammonium salt (B) | B1 | 2 |  |  |  | 2 | 2 |
|  | B2 |  | 2 |  |  |  |  |
|  | BTMAH-40 |  |  | 2 |  |  |  |
| Organic tin catalyst | No. 918 |  |  |  |  |  |  |
|  | NEOSTANN U-220H |  |  |  |  |  |  |
| Filler | Hakuenka CCR | 75 | 75 | 75 | 75 | 75 | 75 |
|  | WHITON SB | 75 | 75 | 75 | 75 | 75 | 75 |
| plasticizer | DOP | 40 | 40 | 40 | 40 | 40 | 40 |
| thixotropic agent | DISPARLON 6500 | 3 | 3 | 3 | 3 | 3 | 3 |
| Silane coupling agent | KMB-1003 | 3 | 3 | 3 | 3 | 3 | 3 |
|  | KMB-603 | 1 | 1 | 1 | 1 | 1 | 1 |
|  | KMB-403 | 1 | 1 | 1 | 1 | 1 | 1 |
| Surface state of curable composition after durability test |  | Good | Good | Good | Good | Good | Good |

|  |  | Comparative Example |  |  |  |
|---|---|---|---|---|---|
|  |  | 5 | 6 | 7 | 8 |
| Oxyalkylene polymer (A) | A1 | 100 | 100 |  |  |
|  | A2 |  |  |  |  |
|  | A3 |  |  | 100 |  |
|  | A4 |  |  |  |  |
| Acrylic polymer (C) | Acrylic polymer (C1) + A1 |  |  |  | 100 |
| Quaternary ammonium salt (B) | B1 |  |  |  |  |
|  | B2 |  |  |  |  |
|  | BTMAH-40 |  |  |  |  |
| Organic tin catalyst | No. 918 | 2 |  | 2 | 2 |
|  | NEOSTANN U-220H |  | 2 |  |  |
| Filler | Hakuenka CCR | 75 | 75 | 75 | 75 |
|  | WHITON SB | 75 | 75 | 75 | 75 |
| plasticizer | DOP | 40 | 40 | 40 | 40 |
| thixotropic agent | DISPARLON 6500 | 3 | 3 | 3 | 3 |
| Silane coupling agent | KMB-1003 | 3 | 3 | 3 | 3 |
|  | KMB-603 | 1 | 1 | 1 | 1 |
|  | KMB-403 | 1 | 1 | 1 | 1 |
| Surface state of curable composition after durability test |  | Swelling observed | Swelling observed | Swelling observed | Swelling observed |

As shown in Table 2, with respect to the cured products obtained by using the curable compositions of Examples 8 to 13, no swelling was observed on the surface after reacting the cycle of aging, and the durability was excellent. On the other hand, in Comparative Examples 5 to 8 wherein an organic compound was used without using the component (B), swelling was observed on the surface after repeating the cycle of aging, and there was a problem in durability.

INDUSTRIAL APPLICABILITY

The curable composition of the present invention is excellent in curability and can provide a cured product which has good durability. Further, a metal compound is not used as a curing catalyst, whereby it is possible to obtain a cured product which is environmentally friendly. The curable composition of the present invention is useful in such a field as a sealing material (e.g. an elastic sealing material for construction or a sealing material for a multilayered glass), a sealant (e.g. a sealant for rust prevention and water prevention of glass edges or a sealant for the back surface of a solar cell), an electrical insulation material (an insulation covering agent for electrical wires and cables), or a adhesive for construction (an adhesive for indoor walls or an adhesive for outside walls). Further, the curable composition of the present invention is useful also as a tackifier, a coating material, a film material, a gasket material or a cast molding material.

The entire disclosure of Japanese Patent Application No. 2006-225201 filed on Aug. 22, 2006 including specification, claims, drawings and summary is incorporated herein by reference in its entirety.

What is claimed is:

1. A curable composition comprising an oxyalkylene polymer (A) having a reactive silicon group represented by the following formula (1), and a quaternary ammonium salt (B) represented by the following formula (2):

$$—SiX^1_aR^1_{3-a} \quad (1)$$

wherein $R^1$ is a $C_{1-20}$ monovalent organic group which may have a substituent, $X^1$ is a hydroxyl group or a hydrolyzable group, and a is an integer of from 1 to 3; provided that when plural $R^1$s are present, they may be the same or different from one another, and when plural $X^1$s are present, they may be the same or different from one another

(2)

wherein each of $R^2$ to $R^5$ is independently a $C_{1-25}$ linear or branched saturated or unsaturated hydrocarbon group, and $X^2$ is an organic acid ion, an inorganic acid ion or a hydroxyl group, wherein 2 or 3 groups among $R^2$ to $R^5$ are $C_{6-25}$ linear or branched saturated or unsaturated hydrocarbon groups, and the remaining groups are a $C_{1-5}$ linear or branched saturated hydrocarbon group.

2. The curable composition according to claim 1, wherein the oxyalkylene polymer (A) is a polymer obtained by a process comprising urethanization reaction of a polymer (pP) having a polyoxyalkylene chain and hydroxyl groups, with an isocyanate compound (U) having a group represented by the following formula (3) and isocyanate groups, and the ratio of the total number of isocyanate groups in the isocyanate compound (U) to the total number of hydroxyl groups in the polymer (pP) (a molar ratio of isocyanate groups/hydroxyl groups), in the urethanization reaction is from 0.80 to 1.10:

$$—SiX^1_aR^1_{3-a} \quad (3)$$

wherein $R^1$ is a $C_{1-20}$ monovalent organic group which may have a substituent, $X^1$ is a hydroxyl group or a hydrolyzable group, and a is an integer of from 1 to 3; provided that when plural $R^1$s are present, they may be the same or different from one another, and when plural $X^1$s are present, they may be the same or different from one another.

3. The curable composition according to claim 1, wherein the oxyalkylene polymer (A) has from 1 to 8 reactive silicon groups represented by the formula (1), per molecule of the polymer.

4. The curable composition according to claim 1, wherein the oxyalkylene polymer (A) is a polymer having a polyoxypropylene chain substantially as its main chain.

5. The curable composition according to claim 2, wherein $X^2$ in the quaternary ammonium salt (B) is a carboxylic acid.

6. The curable composition according to claim 1, which comprises from 0.1 to 10 parts by mass of the quaternary ammonium salt (B) per 100 parts by mass of the oxyalkylene polymer (A).

7. The curable composition according to claim 1, which further comprises an acrylic polymer (C) having a reactive silicon group represented by the following formula (4) and an alkyl (meth)acrylate monomer unit:

$$—SiX^{41}_bR^{41}_{3-b} \quad (4)$$

wherein $R^{41}$ is a $C_{1-20}$ monovalent organic group which may have a substituent, $X^{41}$ is a hydroxyl group or a hydrolyzable group, and b is an integer of from 1 to 3; provided that when plural $R^{41}$s are present, they may be the same or different from one another, and when plural $X^{41}$s are present, they may be the same or different from one another.

8. The curable composition according to claim 7, which comprises from 0.1 to 10 parts by mass of the quaternary ammonium salt (B) per 100 parts by mass in total of the oxyalkylene polymer (A) and the acrylic polymer (C).

9. The curable composition according to claim 1, wherein reactive silicon group represented by the formula (1) is a trimethoxysilyl group.

10. The curable composition according to claim 1, wherein said acrylic polymer (C) comprises alkyl (meth)acrylate monomers represented by the following formula (9), as monomer units:

$$CH_2=CR^9COOR^{10} \quad (9)$$

wherein $R^9$ is a hydrogen atom or a methyl group, and $R^{10}$ is an alkyl group, wherein the acrylic polymer (C) is a polymer (C-1) comprising an alkyl (meth)acrylate monomer unit having a $C_{1-8}$ alkyl group as $R^{10}$, and an alkyl (meth)acrylate monomer unit having the alkyl group with 10 to 30 carbon atoms, or a polymer (C-2) containing an alkyl (meth)acrylate monomer unit having a $C_{1-2}$ alkyl group as $R^{10}$ and an alkyl (meth)acrylate monomer unit having an alkyl group having 3 to 10 carbon atoms.

* * * * *